United States Patent
Tsemekhman et al.

(10) Patent No.: US 12,387,240 B2
(45) Date of Patent: *Aug. 12, 2025

(54) METHODS, SYSTEMS, AND MEDIA FOR SETTING AND USING AN ADVERTISEMENT FREQUENCY CAP BASED ON CAUSAL CONVERSIONS

(71) Applicant: Integral Ad Science, Inc., New York, NY (US)

(72) Inventors: Kiril Tsemekhman, Long Island City, NY (US); Vadim Tsemekhman, Seattle, WA (US)

(73) Assignee: Integral Ad Science, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,003

(22) Filed: Dec. 21, 2023

(65) Prior Publication Data

US 2024/0127289 A1 Apr. 18, 2024

Related U.S. Application Data

(63) Continuation of application No. 14/923,076, filed on Oct. 26, 2015, now Pat. No. 11,928,711.

(60) Provisional application No. 62/068,427, filed on Oct. 24, 2014.

(51) Int. Cl.
G06Q 30/0241 (2023.01)
G06Q 30/0242 (2023.01)
G06Q 30/0251 (2023.01)

(52) U.S. Cl.
CPC ..... *G06Q 30/0264* (2013.01); *G06Q 30/0243* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 2003/0014304 A1* | 1/2003 | Calvert | ............... | G06Q 30/0255 705/14.42 |
| 2005/0086110 A1* | 4/2005 | Haley | ................ | G06Q 30/0242 705/14.66 |
| 2006/0041480 A1* | 2/2006 | Briggs | ............... | G06Q 30/0243 705/14.48 |
| 2006/0224445 A1* | 10/2006 | Axe | ....................... | G06Q 30/02 705/14.69 |
| 2011/0055001 A1* | 3/2011 | Mattern | ............. | G06Q 30/0277 705/14.43 |
| 2011/0119126 A1* | 5/2011 | Park | ................... | G06Q 30/0242 705/14.45 |

OTHER PUBLICATIONS

AdSpeed, "Frequency Capping", retrieved from https://www.adspeed.com/Knowledges/250/Ad-Targeting-Restrictions/Frequency-Capping.html, available on Jul. 11, 2014 (Year: 2014).*

(Continued)

*Primary Examiner* — Sam Refai

(74) *Attorney, Agent, or Firm* — Byrne Poh LLP

(57) ABSTRACT

In accordance with some embodiments of the disclosed subject matter, methods, systems, and media for setting and using an advertisement frequency cap based on causal conversions or impact of advertisements are provided.

21 Claims, 4 Drawing Sheets

(56) References Cited

OTHER PUBLICATIONS

AdSpeed, "Frequency Capping", last accessed Jul. 11, 2014, pp. 1-5, available at: https://www.adspeed.com/Knowledges/250/Ad-Targeting-Restrictions/Frequency-Capping.html.
Notice of Allowance dated Mar. 13, 2023 in U.S. Appl. No. 14/923,076, pp. 1-42.
Office Action dated Feb. 2, 2021 in U.S. Appl. No. 14/923,076, pp. 1-13.
Office Action dated May 14, 2019 in U.S. Appl. No. 14/923,076, pp. 1-21.
Office Action dated Jul. 17, 2020 in U.S. Appl. No. 14/923,076, pp. 1-12.
Office Action dated Sep. 28, 2021 in U.S. Appl. No. 14/923,076, pp. 1-13.
Office Action dated Oct. 12, 2018 in U.S. Appl. No. 14/923,076, pp. 1-14.
Office Action dated Dec. 30, 2019 in U.S. Appl. No. 14/923,076, pp. 1-20.

* cited by examiner

METHODS, SYSTEMS, AND MEDIA FOR SETTING AND USING AN ADVERTISEMENT FREQUENCY CAP BASED ON CAUSAL CONVERSIONS

CROSS-REFERENCE TO RELATED APPLICATIONS

This application is a continuation of U.S. patent application Ser. No. 14/923,076, filed Oct. 26, 2015, which claims the benefit of U.S. Provisional Patent Application No. 62/068,427, filed Oct. 24, 2014, each of which is hereby incorporated by reference herein in its entirety.

BACKGROUND

In recent years, the ability to target particular users with particular characteristics (e.g., targeted based on psychographic characteristics, demographic characteristics, etc.) with online advertising has grown very quickly. With this growth, advertising frequency caps have been instituted to prevent advertising publishers from targeting the same users too many times. Targeting the same users with too many advertisements can be wasteful because there are often diminishing returns to presenting ever more advertisements to the same users. Traditional advertising frequency caps are typically per publisher, such that each publisher is limited in the number of advertisements targeted at a particular user (e.g., three advertisements per day), but different publishers may all target the same user up to their cap each day (e.g., if there are three publishers that each target the same user three times, the user can be presented with nine advertisements). As a result of this, not only can this be a waste of advertising budget by targeting a high number of advertisements at the same users, but it can be a wasted opportunity to use that advertising budget to target other customers that may not be targeted at all with the traditional caps.

Accordingly, it is desirable to provide methods, systems, and media for setting and using an advertisement frequency cap based on causal conversions.

SUMMARY

In accordance with some embodiments of the disclosed subject matter, mechanisms, which can include methods, systems, and/or media, for setting and using an advertisement frequency cap based on causal conversions or impact of advertisements are provided.

In accordance with some embodiments of the disclosed subject matter, a method for determining whether to present an advertisement on client devices is provided, the method comprising: setting a campaign frequency cap for an advertising campaign based on campaign characteristics; in response to determining that the campaign frequency cap has not been exceeded, transmitting, to a plurality of client devices, an advertisement from the advertising campaign that includes client-side code that, when executed by each of the plurality of client devices, causes each client device to: determine a probability of whether the advertisement in the advertising campaign was likely to have been viewed on a client device based on size of the advertisement, URL information associated with a web page on which the advertisement is being presented, and in-view time of the web page that includes the advertisement on the client device; and identify the client device as one of a subset of converting users from a plurality of user types based on page visitation information responsive to the advertisement; determining, for each of the client devices identified as one of a subset of converting users, an expected number of viewed advertisements for the advertising campaign based on the probability whether the advertisement in the advertising campaign was likely to have been viewed on a client device of one of the subset of converting users; generating a probabilistic distribution of campaign conversions as a function of the number of advertisements each of the subset of converting users viewed prior to performing a conversion event; updating the campaign frequency cap for the advertising campaign based on the generated probabilistic distribution; and transmitting a request to an advertising server to prevent the advertisement and additional advertisements within the advertising campaign from being served to client devices in response to determining that the campaign frequency cap has been exceeded.

In accordance with some embodiments of the disclosed subject matter, a system for determining whether to present an advertisement on client devices is provided, the system comprising a hardware processor that is configured to: set a campaign frequency cap for an advertising campaign based on campaign characteristics; in response to determining that the campaign frequency cap has not been exceeded, transmit, to a plurality of client devices, an advertisement from the advertising campaign that includes client-side code that, when executed by each of the plurality of client devices, causes each client device to: determine a probability of whether the advertisement in the advertising campaign was likely to have been viewed on a client device based on size of the advertisement, URL information associated with a web page on which the advertisement is being presented, and in-view time of the web page that includes the advertisement on the client device; and identify the client device as one of a subset of converting users from a plurality of user types based on page visitation information responsive to the advertisement; determine, for each of the client devices identified as one of a subset of converting users, an expected number of viewed advertisements for the advertising campaign based on the probability whether the advertisement in the advertising campaign was likely to have been viewed on a client device of one of the subset of converting users; generate a probabilistic distribution of campaign conversions as a function of the number of advertisements each of the subset of converting users viewed prior to performing a conversion event; update the campaign frequency cap for the advertising campaign based on the generated probabilistic distribution; and transmit a request to an advertising server to prevent the advertisement and additional advertisements within the advertising campaign from being served to client devices in response to determining that the campaign frequency cap has been exceeded.

In accordance with some embodiments of the disclosed subject matter, a non-transitory computer-readable medium containing computer-executable instructions that, when executed by a processor, cause the processor to perform a method for determining whether to present an advertisement on client devices is provided, the method comprising: setting a campaign frequency cap for an advertising campaign based on campaign characteristics; in response to determining that the campaign frequency cap has not been exceeded, transmitting, to a plurality of client devices, an advertisement from the advertising campaign that includes client-side code that, when executed by each of the plurality of client devices, causes each client device to: determine a probability of whether the advertisement in the advertising campaign was likely to have been viewed on a client device based on size of the advertisement, URL information associated with a web page on which the advertisement is being presented, and in-view time of the web page that includes the advertisement on the client device; and identify the client device as one of a subset of converting users from a plurality of user types based on page visitation information responsive to the advertisement; determining, for each of the client devices identified as one of a subset of converting users, an expected number of viewed advertisements for the advertising campaign based on the probability whether the advertisement in the advertising campaign was likely to have been viewed on a client device of one of the subset of converting users; generating a probabilistic distribution of campaign conversions as a function of the number of advertisements each of the subset of converting users viewed prior to performing a conversion event; updating the campaign frequency cap for the advertising campaign based on the generated probabilistic distribution; and transmitting a request to an advertising server to prevent the advertisement and additional advertisements within the advertising campaign from being served to client devices in response to determining that the campaign frequency cap has been exceeded.

In accordance with some embodiments of the disclosed subject matter, a method for determining whether to present an advertisement on client devices is provided, the method comprising: receiving, at a client device, an advertisement from an advertising campaign for display within a region of a web page; determining, for the client device, a probability that the advertisement has been viewed on the client device based on size of the advertisement, URL information associated with the web page on which the advertisement was placed, and an in-view time of the web page that includes the advertisement on the client device; determining, for the client device, an expected number of viewed advertisements based on the probability; determining whether a frequency cap for an advertising campaign that includes the advertisement has been exceeded by comparing the expected number of viewed advertisements with a predicted number of viewed advertisements prior to a conversion event, wherein the predicted number of viewed advertisements prior to the conversion event is based on a probabilistic distribution of campaign conversions as a function of the number of advertisements that each of a subset of converting users viewed prior to performing the conversion event; and transmitting a request to an advertising server indicating that the frequency cap has been exceeded, wherein the request causes the advertisement server to inhibit advertisements from the advertising campaign from being served to the client device.

In accordance with some embodiments of the disclosed subject matter, a system for determining whether to present an advertisement on client devices is provided, the system comprising a hardware processor that is configured to: receive, at a client device, an advertisement from an advertising campaign for display within a region of a web page; determine, for the client device, a probability that the advertisement has been viewed on the client device based on size of the advertisement, URL information associated with the web page on which the advertisement was placed, and an in-view time of the web page that includes the advertisement on the client device; determine, for the client device, an expected number of viewed advertisements based on the probability; determine whether a frequency cap for an advertising campaign that includes the advertisement has been exceeded by comparing the expected number of viewed advertisements with a predicted number of viewed advertisements prior to a conversion event, wherein the predicted number of viewed advertisements prior to the conversion event is based on a probabilistic distribution of campaign conversions as a function of the number of advertisements that each of a subset of converting users viewed prior to performing the conversion event; and transmit a request to an advertising server indicating that the frequency cap has been exceeded, wherein the request causes the advertisement server to inhibit advertisements from the advertising campaign from being served to the client device.

In accordance with some embodiments of the disclosed subject matter, a non-transitory computer-readable medium containing computer-executable instructions that, when executed by a processor, cause the processor to perform a method for determining whether to present an advertisement on client devices is provided, the method comprising: receiving, at a client device, an advertisement from an advertising campaign for display within a region of a web page; determining, for the client device, a probability that the advertisement has been viewed on the client device based on size of the advertisement, URL information associated with the web page on which the advertisement was placed, and an in-view time of the web page that includes the advertisement on the client device; determining, for the client device, an expected number of viewed advertisements based on the probability; determining whether a frequency cap for an advertising campaign that includes the advertisement has been exceeded by comparing the expected number of viewed advertisements with a predicted number of viewed advertisements prior to a conversion event, wherein the predicted number of viewed advertisements prior to the conversion event is based on a probabilistic distribution of campaign conversions as a function of the number of advertisements that each of a subset of converting users viewed prior to performing the conversion event; and transmitting a request to an advertising server indicating that the frequency cap has been exceeded, wherein the request causes the advertisement server to inhibit advertisements from the advertising campaign from being served to the client device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some embodiments of the disclosed subject matter, methods, systems, and media for setting and using an advertisement frequency cap based on causal conversions or impact of advertisements are provided. In some embodiments, a campaign frequency cap can be determined based on observed behavior of users presented with advertisements. Such a campaign frequency cap can include one or more caps for setting a limit on the number of campaign advertisements presented to and viewed by a user during a predetermined amount of time such as, per day, per week, per month, over the lifetime of the campaign, or any other suitable time. As used herein, campaign advertisements are advertisements associated with a particular advertising campaign by an advertiser. Such a campaign can include different advertisements having different sizes, images, etc. Such advertisements can include any suitable content, such as text, images, video, links, etc. Each advertisement that is part of a campaign can also include a campaign identification, such as a tag in the code for the advertisement, information in metadata associated with the advertisement, etc.

In some embodiments, the methods, systems, and media described herein can track the viewability of all campaign advertisements that are presented to a particular user. For example, upon a campaign advertisement being presented to a user (e.g., an advertisement can be presented to the user by loading the advertisement by a browser) the methods, systems, and media described herein can cause information on viewability of the advertisement to be reported to the mechanisms described herein. Additionally, viewability information for campaign advertisements provided to users from multiple publishers can be tracked by inserting code into each advertisement (e.g., HTML, code, JavaScript code, etc.) to cause a browser loading the advertisement to cause viewability information to be reported to the mechanisms described herein.

In some embodiments, the methods, systems, and media described herein can determine an expected number of advertisements viewed by each particular user based on the number of campaign advertisements presented to the users and the viewability information of each of the campaign advertisements.

Figure 1:
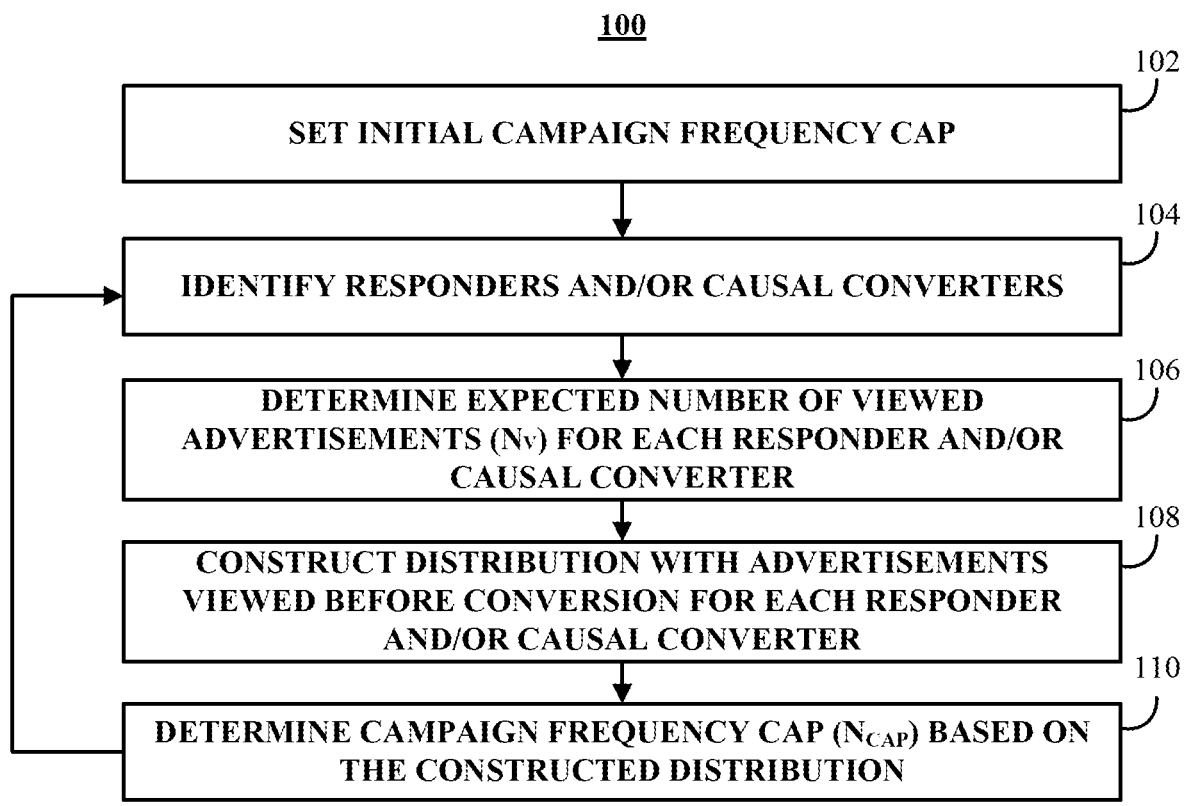
FIG. 1 shows an illustrative process for setting an advertisement frequency cap based on causal conversion information, which can include determining the number of viewed impressions on a given advertising campaign and determining the campaign frequency cap based on a distribution of the number of campaign conversions as a function of the number of advertisements a responder-converter user viewed prior to conversion, in accordance with some embodiments of the disclosed subject matter.

Turning to FIG. 1, an example 100 of a process for setting an advertisement frequency cap based on causal conversion information is shown in accordance with some embodiments of the disclosed subject matter. In some embodiments, such an advertisement frequency cap can be set for a particular advertising campaign of a particular advertiser. Prior to beginning process 100, various parameters of the campaign can be established, such as the size of the campaign (e.g., total number of advertisements to serve, total number of advertisements to serve per day, total budget, etc.), targeting information (e.g., certain demographic and/or psychographic characteristics to target, etc.), information about the product and/or service being advertised (e.g., a category of the product and/or service being advertised, etc.), the nature of the campaign (e.g., product advertising, brand advertising, advertising a limited time sale, etc.). As shown in FIG. 1, at 102, process 100 can set an initial campaign frequency cap for the campaign. Such an initial campaign frequency cap can be set using any suitable technique(s). For example, a campaign frequency cap can be set at a default level based on industry norms (e.g., three impressions per user per day, ten impressions per user per month, etc.). As another example, frequency cap information that has been determined in the past for other similar products can be used to set the initial frequency cap. As yet another example, frequency cap information that has been determined in the past for other advertising campaigns by the same or similar advertiser can be used to set the initial frequency cap. As still another example, frequency cap information that has been determined in the past for a similar type of campaign (e.g., a product advertisement campaign, a brand advertisement campaign, etc.) can be used to set the initial frequency cap.

In some embodiments, the initial frequency cap can be set at a level that is a predetermined amount above a default frequency cap. For example, an average frequency cap across various campaigns from various advertisers can be determined, and the initial frequency cap can be set at a level that is a predetermined amount above the average level. This can be done so that an initial frequency cap is not set below a level where the most users respond to the advertisement and or perform a conversion event (e.g., as described below). Therefore, the initial frequency cap can be set at a predetermined level above the default level to inhibit the cap being reached prior to gathering useful information from users in order to set the frequency cap (e.g., at 110, described below).

In some embodiments, the campaign frequency cap can include multiple different caps, such as a daily frequency cap, a weekly frequency cap, a monthly frequency cap, a lifetime frequency cap for the campaign, and/or any other suitable frequency cap. For example, a daily frequency cap can be set at a relatively low number, and advertisements can be presented to a particular user each day until the daily frequency cap is met. As another example, if a lifetime frequency cap is met (e.g., a relatively higher number, regardless of whether a daily frequency cap or any other frequency cap is included in the campaign frequency cap) and if the lifetime cap is met for a particular user, no more advertisements are to be presented to that user.

At 104, process 100 can identify users that are responders and/or causal converters. In some embodiments, a responder can be a user identified as having responded to a campaign advertisement (e.g., an advertisement that is part of the advertising campaign for which the campaign frequency cap has been set) by visiting a web site associated with the advertisement. Any suitable technique(s) can be used to determine whether a particular user is a responder. For example, a cookie can be placed on a browser of a user when the user is presented with a campaign advertisement, and subsequently, if the user visits a web site associated with the campaign advertisement the user can be identified as a responder by the presence of the cookie on the user's browser. As another example, monitoring code can be inserted into a campaign advertisement that is presented to a user, and such monitoring code can, among other things, determine whether the user subsequently visits a web site associated with the campaign advertisement. As yet another example, code can be inserted into a campaign advertisement presented to a user to report an Internet Protocol (IP) address or device identification number (e.g., a device ID) of the computing device presenting the campaign advertisement to a remote server, and an IP address (or device ID) of devices that request an associated web site can be checked against the IP addresses (or device IDs) of devices that were reported to have been presented with the campaign advertisements. Additionally, in such an example, rather than reporting the IP address (or device ID) of the device, a number representing the IP address (or device ID) can be reported and/or stored (e.g., an anonymized number representing the IP address or device ID). Additionally, in some embodiments, process 100 can determine a probability that the user viewed the campaign advertisement prior to going to the associated web site using any suitable technique(s). For example, monitoring code can determine whether the campaign advertisement was viewable in the user's browser, how long the campaign advertisement was viewable, etc. In such embodiments, if the campaign advertisement was viewable for a particular length of time and/or using any other criteria, monitoring code can determine a probability that the campaign advertisement was viewed by the user. Furthermore, in some embodiments, a campaign ID of the campaign advertisement can be sent along with the information identifying the particular user and/or information about whether the advertisement was viewed by the user. Features for determining an amount of time that an advertisement was viewable by a consumer are further described, for example, in commonly owned, commonly assigned U.S. patent application Ser. No. 13/614,878, which is hereby incorporated by reference herein in its entirety.

In some embodiments, a converter can be a user identified as having performed a conversion action after being presented with a campaign advertisement. A conversion event can include any action taken in connection with being presented with the campaign advertisement. For example, a conversion event can include engagement with or clicking on the campaign advertisement, accessing and/or browsing a web site of the advertiser, downloading and/or purchasing a product sold or provided by the advertiser, signing up for a subscription from the advertiser, providing information to be added to an advertiser's mailing list, etc. A similar technique(s) for determining a responder can be used to determine a conversion (e.g., using monitoring code, a cookie(s), IP address logging, etc.)

In some embodiments, a causal converter can be a user identified as having performed a conversion event in response to viewing the campaign advertisement (e.g., the conversion is caused at least in part by having viewed the campaign advertisement). For example, if a user is determined to have been presented with a campaign advertisement, and also is determined to have viewed the campaign advertisement (e.g., as described above in connection with responders) that user can be a causal converter if the user subsequently performs a conversion action. Features for determining causal converters and causal conversion metrics are further described, for example, in commonly owned, commonly assigned U.S. patent application Ser. No. 14/084, 568, which is hereby incorporated by reference herein in its entirety.

In some embodiments, responders and/or causal converters can be identified based on a length of time between a particular user (e.g., identified using a technique as described above) viewing a campaign advertisement and that particular user visiting an associated web site (e.g., in the case of responders) and/or performing a conversion action. For example, if the time between a most recent viewing of a campaign advertisement and visiting the web site and/or performing the conversion event is greater than a predetermined amount of time (e.g., two days, five days, one week, etc.), the user may not be identified as a responder and/or converter.

In some embodiments, responders and/or causal converters can be identified based on a criteria for identifying responders and/or causal converters defined by an advertiser associated with the campaign and/or determined based on one or more preferences associated with the advertiser (which may or may not correspond to criteria described herein in association with identifying responders and/or causal converters). Additionally or alternatively, in some embodiments, users whose information is to be used in determining a campaign frequency cap (e.g., as described below in connection with 110) can be identified based on the user meeting any suitable criteria (which may, in part, be defined and/or determined based on one or more advertiser preferences), and may or may not be responders and/or causal converters as those terms are used herein.

At 106, process 100 can determine an expected number of viewed campaign advertisements for each responder and/or converter identified at 104. Any suitable technique(s) can be used to determine how many campaign advertisements were viewed by a responder and/or converter prior to visiting a web site associated with the campaign advertisement and/or performing a conversion action. In some embodiments, information on all campaign advertisements viewed by a particular user (e.g., the campaign advertisements are identified using any suitable technique, such as by tracking campaign advertisements viewed by IP address and/or device ID, campaign ID of advertisements, etc.). Additionally, for each of the identified campaign advertisements, process 100 can determine a probability that the campaign advertisement was viewed based on viewability information associated with that particular campaign advertisement.

For example, monitoring code can be inserted into a campaign advertisement that is to be presented to a user (e.g., as described above), and such monitoring code can determine whether the campaign advertisement is viewable by the user and/or how long the campaign advertisement is viewable. In a more particular example, the monitoring code can determine the size of the campaign advertisement (e.g., as dimensions in number of pixels such as X by Y pixels), the placement of the campaign advertisement (e.g., with respect to a reference point within a web site presenting the campaign advertisement), a uniform resource locator (URL) of the web site presenting the campaign advertisement, a total amount of time that the campaign advertisement was in-view while the user's browser was at the web site, whether the campaign advertisement was fully in-view or partially in view, a proportion of the time that the campaign advertisement was fully in-view, partially in-view, and not in-view, and/or any other suitable property or properties of a campaign advertisement(s) presented to the user.

In some embodiments, process 100 can determine a probability that each campaign advertisement was viewed by a particular user based on various properties reported by the monitoring code (e.g., in-view time, size, placement, etc.). Any suitable criteria for determining a probability that the campaign advertisement was viewed can be used. For example, if the monitoring code reported that the campaign advertisement was in-view for longer than a predetermined amount of time (e.g., for more than one second, for more than two seconds, etc.), process 100 can identify such a campaign advertisement as having been viewed by the user (e.g., 100% probability that the campaign advertisement was viewed). As another example, the in-view time can be considered as one factor in determining a probability that the campaign advertisement was viewed (e.g., a smaller advertisement can be considered less likely to be viewed than a lager advertisement, an advertisement that expands upon loading a website can be considered more likely to be viewed than an advertisement that does not change in size, etc.).

In some embodiments, process 100 can determine for each campaign advertisement, whether it was more likely than not (e.g., a probability that the campaign advertisement was viewed over 50%) that the campaign advertisement was viewed by the user. Additionally or alternatively, any other suitable threshold and/or criteria can be used to determine whether a user is expected to have viewed the advertisement. For example, process 100 can determine whether the campaign advertisement was likely viewed for a threshold length of time, that a video advertisement was viewed for a particular length of time, etc.

In some embodiments, process 100 can determine the total number of campaign advertisements viewed by that user prior to visiting a web site associated with the campaign advertisement (e.g., prior to being identified as a responder) or performing a conversion action (e.g., prior to being identified as a causal converter). In some embodiments, this can be referred to as the expected number of viewed campaign advertisements $N_v$ for the user.

At 108, process 100 can construct a distribution of the expected number of viewed campaign advertisements using $N_v$ calculated for each responder and/or causal converter at 106. Such a distribution can plot $N_v$ for each responder and/or causal converter such that the distribution of $N_v$ across all responders and/or causal converters can be determined. Such a distribution may increase from zero users viewing zero campaign advertisements (e.g., a user cannot become a responder and/or converter without having first viewed a campaign advertisement in the campaign) to a single maximum (e.g., the number of campaign advertisements most viewers view prior to being identified as a responder and/or causal converter) and then decay as the number of campaign advertisements viewed increases. For example, the maximum can be a relatively low number (e.g., three, five, eight, etc.) and the distribution can decay from the maximum because a user that viewed a high number of campaign advertisements may be less likely to respond to viewing an additional campaign advertisement than a user that has viewed less campaign advertisements (e.g., there may be diminishing returns to presenting ever greater numbers of advertisements to a particular user). In some embodiments, the distribution of $N_v$ for certain campaigns may have multiple local maxima. For example, if one group of users targeted for campaign advertisements typically responds to relatively few advertisements and a second group targeted for the campaign advertisements typically responds after being targeted with several more advertisements.

At 110, process 100 can determine a campaign frequency cap (NCAP) based on the distribution constructed at 108. Any suitable point on the distribution can be determined as the campaign frequency cap. For example, the campaign frequency cap ($N_{CAP}$) can be set to balance various goals, such as to economize the advertising budget for the campaign and to get the most users to respond to the advertising campaign and/or perform a conversion action. As a more particular example, the campaign frequency cap can be set such that the expected number of viewed campaign advertisements ($N_v$) of ninety percent (90%) of responders and/or causal converters fall within the campaign frequency cap ($N_{CAP}$). In some embodiments, an advertiser can set a cut-off level for the campaign frequency cap qualitative and/or quantitatively (e.g., using a slider that goes from a smaller cap cut-off to a larger cap cut-off, by entering a percentage of responders and/or converters to be included within the cap, by selecting a qualitative level from a list of levels for a cut-off, etc.). This can allow an advertiser to determine a tradeoff between cost-effectiveness and a total number of responders and/or converters that the advertiser can expect to respond to the advertising campaign based on the selected cut-off for the campaign frequency cap. In some embodiments, $N_{CAP}$ can be checked based on a comparison of a shape of the distribution of $N_v$ to the distribution for other campaigns and/or a distribution of $N_v$ other historical advertising information. If the shapes are different by more than a predetermined amount (e.g., a value of $N_v$ associated with the maximum of the historical distribution(s) is significantly greater than the value of $N_v$ associated with the maximum for the distribution of the advertising campaign, a value of $N_v$ associated with the maximum of the historical distribution(s) is significantly less than the value of $N_v$ associated with the maximum for the distribution of the advertising campaign, the shape of the historical distribution(s) is less evenly distributed than the shape of the distribution for the advertising campaign, etc.), the campaign frequency cap can be determined to be set too low or too high. Additionally, in some embodiments, a conversion rate for users that were presented with campaign advertisements but are determined to have not viewed any campaign advertisements can be compared to a conversion rate for users that have viewed campaign advertisements (e.g., a causal conversion rate). A difference between the causal conversion rate and the conversion rate for users that did not view campaign advertisements can be found, in some embodiments, and if the difference is below a predetermined level, it may indicate that $N_{CAP}$ is set at too low a level (e.g., because the initial campaign frequency cap was set at too low of an initial level).

In some embodiments, process 100 can return to 104-110 and continue to track the distribution of campaign advertisements viewed prior to response and/or conversion by users. Additionally, if a shape of the distribution changes (e.g., the views for which the distribution is at a maximum changes, a curve of the distribution changes), a new campaign frequency cap can be determined based on the differences between the prior distribution and the changed distribution. For example, if the number of campaign advertisement views prior to response and/or conversion by users at which the distribution is a maximum increases, the campaign frequency cap can be increased such that the new campaign frequency cap is expected to include 90% of those that would respond and/or convert without a campaign frequency cap.

Figure 2:
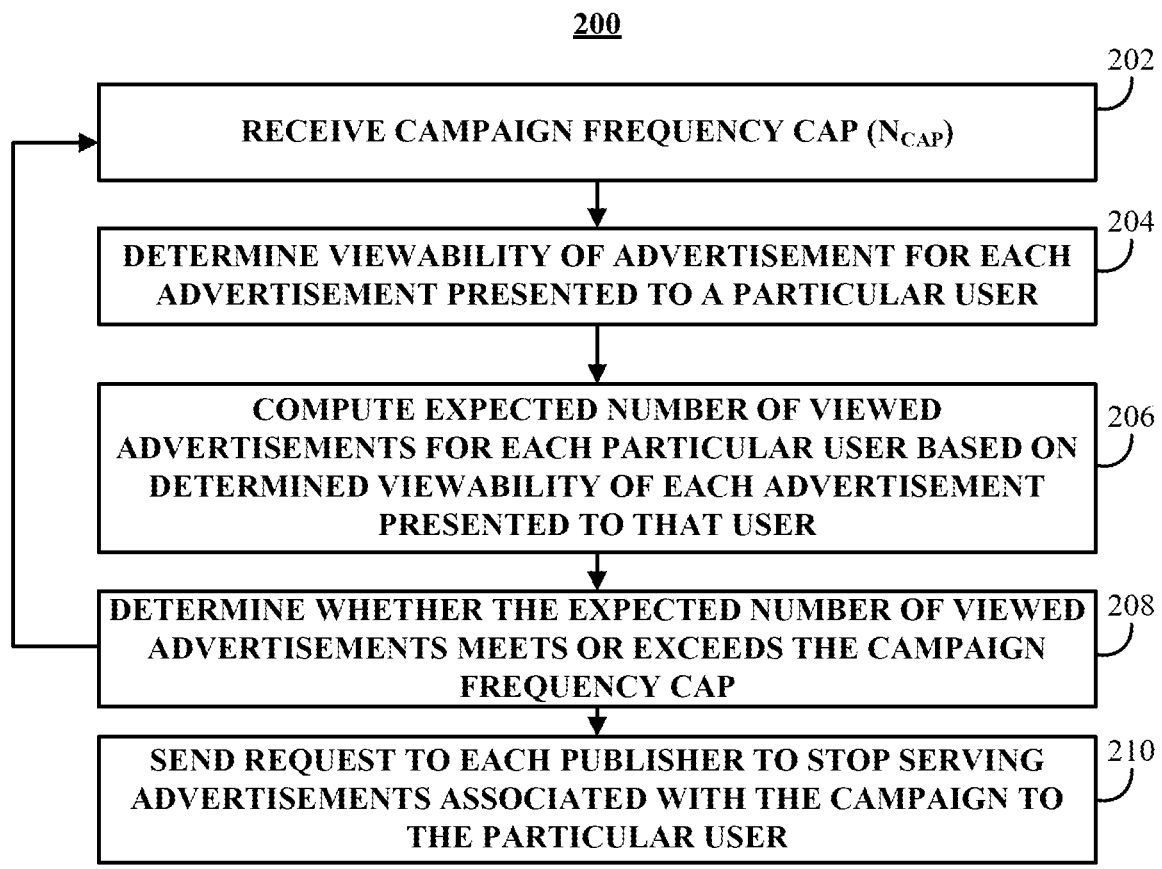
FIG. 2 shows an illustrative process for using a campaign advertisement frequency cap based on causal conversion information in accordance with some embodiments of the disclosed subject matter.

Turning to FIG. 2, an example 200 of a process for using a campaign advertisement frequency cap based on causal conversion information is shown in accordance with some embodiments of the disclosed subject matter. At 202, process 200 can receive a campaign frequency cap (e.g., $N_{CAP}$). Any suitable campaign frequency cap can be received. For example, an initial campaign frequency cap can be received as described above in connection with 102 of FIG. 1. As another example, a campaign frequency cap determined at 110 of FIG. 1 can be received as a campaign frequency cap. As described above in connection with 102 of FIG. 1, in some embodiments, the campaign frequency cap can include multiple caps for different periods of time. In such embodiments, a campaign frequency cap can be received for each time period.

At 204, process 200 can determine the viewability of a campaign advertisement presented to a particular user. Any suitable technique(s) can be used to determine the viewability of a campaign advertisement. For example, as described above in connection with FIG. 1, monitoring code can be inserted into a campaign advertisement to be presented to a user, and the monitoring code can report various information about the campaign advertisement (e.g., as described above). Additionally, as described above, the viewability information can be associated with a particular user. For example, as described above in connection with 104 of FIG. 1, an IP address and/or device ID (which can be anonymized or the like) of a device presented with a campaign advertisement can be reported to a remote server to identify a particular user, and viewability information of the campaign advertisement can be associated with the IP address and/or device ID.

At 206, process 200 can compute an expected number of viewed campaign advertisements for the particular user to which the campaign advertisement was presented. Any suitable technique(s) can be used for computing the expected number of viewed campaign advertisements. For example, a probability that a campaign advertisement presented to a user was viewed by the user can be determined. Process 200 can determine a number of campaign advertisements presented to the user for which it is more likely than not that the user viewed the campaign advertisement (e.g., the probability that the campaign advertisement was viewed is greater than 50%). In some embodiments, each time that information is reported for a campaign advertisement presented to a particular user (e.g., based on the IP address of a device presenting the campaign advertisement) that is part of a particular campaign (e.g., based on a campaign ID associated with the campaign advertisement), a probability that the campaign advertisement was viewed by the user can be determined. Additionally, the number of campaign advertisements that are determined to have been viewed by the user can be computed as the expected number of viewed campaign advertisements for the user.

At 208, process 200 can determine whether the expected number of viewed campaign advertisements calculated at 206 meets or exceeds the campaign frequency cap received at 202 (or any one of multiple different campaign frequency caps for different time periods). For example, if the campaign frequency cap received at 202 includes a campaign lifetime cap of ten campaign advertisements and the number of viewed campaign advertisements calculated at 206 is three, the cap is determine to not be exceeded. If the cap is not exceeded at 208, process 200 can return to 202 and determine if a new campaign frequency cap is received, and continue to determine if campaign advertisements presented to the particular user are viewed. On the other hand, if the campaign frequency cap is exceeded, process 200 can proceed to 210.

At 210, process 200 can transmit a request to each publisher associated with the advertising campaign to stop causing presentation of campaign advertisements associated with the campaign to the particular user for which the campaign frequency cap is exceeded. In some embodiments, such as for a campaign frequency cap for a particular period of time (e.g., one day, one week, etc.), such a request can include an expiration day and/or time, after which publishers can be allowed to resume causing presentation of campaign advertisements associated with the campaign.

Additionally, in some embodiments, after sending a request to publishers to stop causing campaign advertisements to be presented to the particular user, the mechanisms described herein can monitor campaign advertisements presented to the particular user for campaign advertisements. If a campaign advertisement is presented to the particular user, the mechanisms described herein can determine that the publisher that caused the campaign advertisement to be presented has not complied with the request to stop such presentations. Such information can be used in various ways, such as evaluating the quality and/or compliance of advertising publishers, determining whether the particular user is being correctly identified by publishers, etc.

Figure 3:
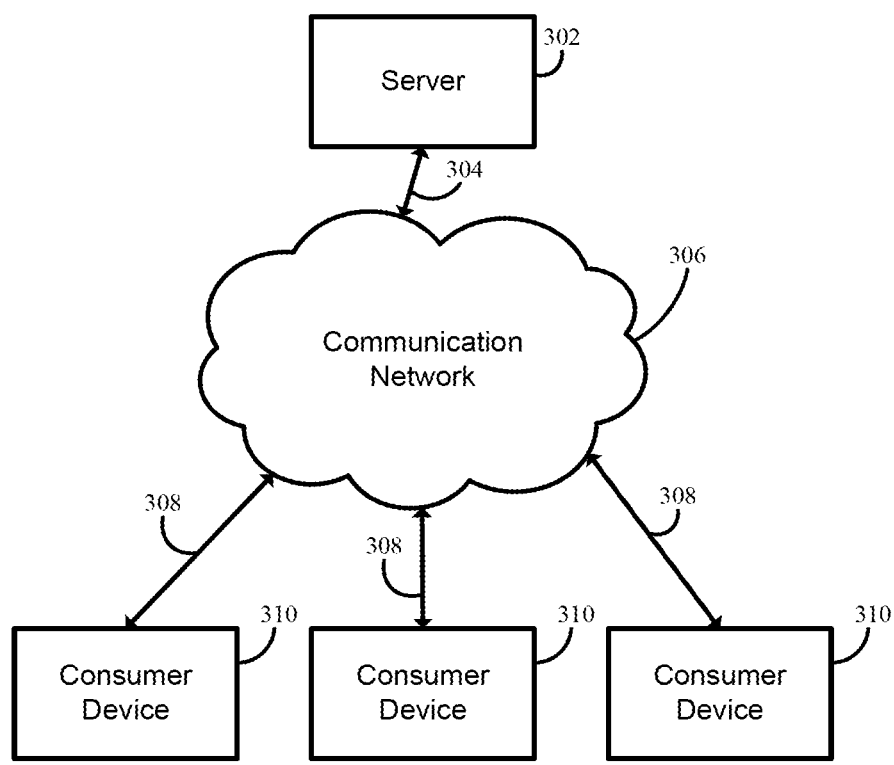
FIG. 3 shows a schematic diagram of an illustrative system suitable for implementation of mechanisms described herein for setting and using an advertisement frequency cap based on causal conversions or impact of advertisements in accordance with some embodiments of the disclosed subject matter.

FIG. 3 shows an example of a generalized schematic diagram of a system 300 on which the mechanisms for setting and using an advertisement frequency cap based on causal conversions described herein can be implemented as an application in accordance with some embodiments. As illustrated, system 300 can include one or more consumer devices 310. Consumer devices 310 can be local to each other or remote from each other. Consumer devices 310 can be connected by one or more communications links 308 to a communications network 306 that can be linked via a communications link 304 to a server 302.

System 300 can include one or more servers 302. Server 302 can be any suitable server for utilizing the mechanisms described herein and/or executing processes 100 and/or 200, such as a processor, a computer, a data processing device, or any suitable combination of such devices. For example, the mechanisms described herein can be distributed into multiple backend components and multiple frontend components or interfaces. In a more particular example, backend components, such as data collection and data distribution can be performed on one or more servers 302.

More particularly, for example, each of the consumer devices 310 and server 302 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, consumer device 310 can be implemented as a personal computer, a smartphone, a tablet computer, a personal data assistant (PDA), a multimedia terminal, a mobile telephone, a set-top box, a television, a game console, etc.

In some embodiments, communications network 306 can be any suitable computer network or combination of networks including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), etc. Communications links 304 and 308 can be any communications links suitable for communicating data between consumer devices 310 and server 302, such as network links, dial-up links, wireless links, hard-wired links, any other suitable communications links, or any suitable combination of such links. Consumer devices 310 can enable a user to load a web page that causes features of mechanisms described herein to be accessed. Consumer devices 310 and server 302 can be located at any suitable location.

Figure 4:
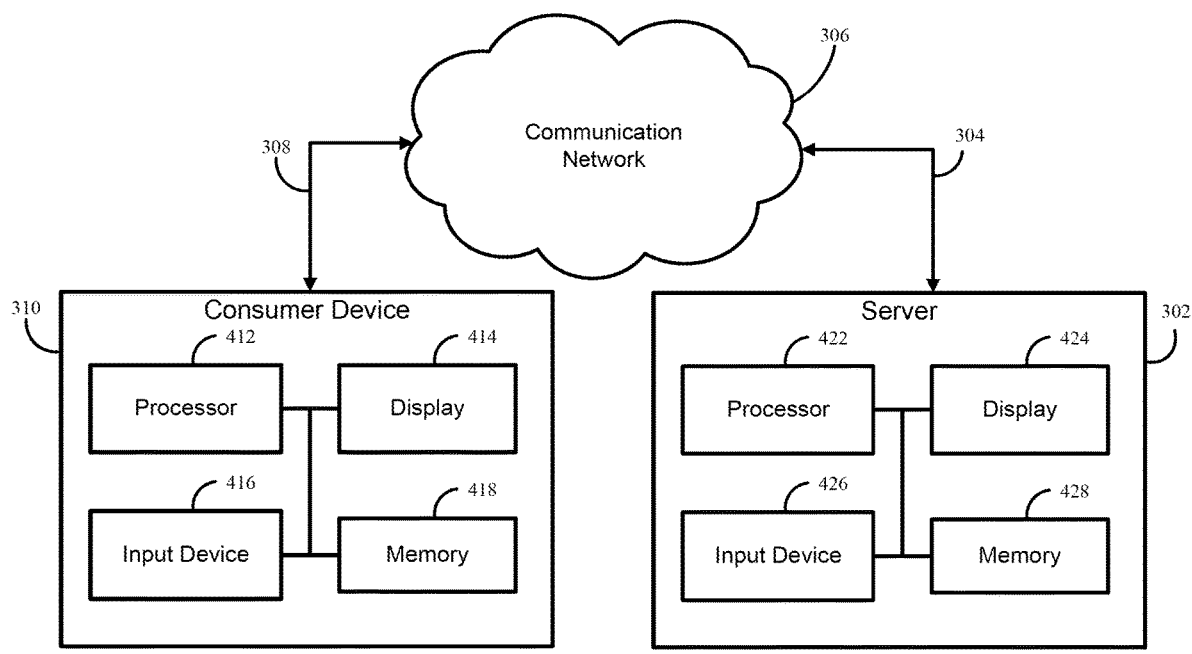
FIG. 4 shows a detailed example of a server and one of the consumer devices of FIG. 3 that can be used in accordance with some embodiments of the disclosed subject matter.

FIG. 4 illustrates an example of hardware 300 where the server and one of the consumer devices depicted in FIG. 3 are illustrated in more detail. Referring to FIG. 4, consumer device 310 can include a processor 412, a display 414, an input device 416, and memory 418, which can be interconnected. In some embodiments, memory 418 can include a storage device (such as a computer-readable medium) for storing a computer program for controlling processor 412.

Processor 412 can use the computer program to present on display 414 a browser window that loads a web page with an advertisement and/or other data received through communications link 308 and commands and values transmitted by a user of consumer device 310. It should also be noted that data received through communications link 308 or any other communications links can be received from any suitable source. Display 414 can be a flat panel display, a cathode ray tube display, a projector, a touch screen, a speaker(s), and/or any other suitable display and/or presentation devices. Input device 416 can be a computer keyboard, a computer mouse, a microphone, a touchpad, a voice recognition circuit, a touchscreen, and/or any other suitable input device.

Server 302 can include processor 422, display 424, input device 426, and memory 428, which can be interconnected. In some embodiments, memory 428 can include a storage device for storing data received through communications link 304 or through other links, and also receives commands and values transmitted by one or more users. The storage device can further include a server program for controlling processor 422.

Hardware processor 422 can use the server program to communicate with consumer devices 310, as well as provide access to and/or copies of the mechanisms described herein. It should also be noted that data received through communications link 304 or any other communications links can be received from any suitable source. In some embodiments, hardware processor 422 can send and receive data through communications link 304 or any other communication links using, for example, a transmitter, receiver, transmitter/receiver, transceiver, or any other suitable communication device. In some embodiments, hardware processor 422 can receive commands and/or values transmitted by one or more users and/or consumer devices 310. Display 424 can be a flat panel display, a cathode ray tube display, a projector, a touch screen, a speaker(s), and/or any other suitable display and/or presentation devices. Input device 426 can be a computer keyboard, a computer mouse, a microphone, a touchpad, a voice recognition circuit, a touchscreen, and/or any other suitable input device.

In some embodiments, server 302 can be implemented in one server or can be distributed as any suitable number of servers. For example, multiple servers 302 can be implemented in various locations to increase reliability and/or increase the speed at which the server can communicate with computing devices 310. As another example, multiple servers 302 can be implemented for performing various tasks, such as one server (or set of servers) can receive reports from monitoring code (e.g., whether an advertisement was viewable, identifying information of a consumer device that loaded the advertisement, etc.), another server (or set of servers) can store information regarding how many campaign advertisements have been viewed by particular users, and yet another server (or set of servers) can provide access to monitoring code to be loaded with advertisements.

In one particular embodiment, the mechanisms described herein can include server-side software, server-side hardware, client-side software, client-side hardware, or any suitable combination thereof. For example, the mechanisms described herein can encompass a computer program written in a programming language recognizable by server 302 and/or by consumer device 310 (e.g., a program written in a programming language, such as, Java, C, Objective-C, C++, C #, Javascript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

The mechanisms described herein can be used in a variety of applications. For example, these mechanisms can be used by an advertiser to manage how many advertisements are presented to a user across all advertising publishers used for a particular campaign. As another example, these mechanisms can be used by an advertiser to manage an advertising campaign to use a budget more effectively by capping the number of advertisements presented to each user so that budget is not wasted on users that are unlikely to ever convert or otherwise show interest because of such advertisements.

Accordingly, methods, systems, and media for setting and using an advertisement frequency cap based on causal conversions are provided.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 and 2 can be executed or performed in any order or sequence not limited to the order and sequence shown and described in the figures. Also, some of the above steps of the processes of FIGS. 1 and 2 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

What is claimed is:

1. A method for determining whether to present an advertisement on client devices, the method comprising:
    setting, using a hardware processor of a server, a campaign frequency cap for an advertising campaign;
    in response to determining that the campaign frequency cap has not been exceeded, inserting, using the hardware processor, client-side code into an advertisement from the advertising campaign that is presented on a plurality of client devices, wherein the client-side code, when executed by each of the plurality of client devices, causes each client device to: determine a probability of whether the advertisement in the advertising campaign was likely to have been viewed on a client device;

determining, using the hardware processor, whether each of the plurality of client devices is one of a subset of converting users from a plurality of user types;

determining, using the hardware processor, for each of the client devices identified as one of a subset of converting users, an expected number of viewed advertisements for the advertising campaign based on the probability of whether the advertisement in the advertising campaign was likely to have been viewed on a client device of one of the subset of converting users;

generating, using the hardware processor, a probabilistic distribution of campaign conversions as a function of the number of advertisements each of the subset of converting users viewed prior to performing a conversion event in response to determining the expected number of viewed advertisements for the advertising campaign based on the probability of whether the advertisement in the advertising campaign was likely to have been viewed on the client device of one of the subset of converting users;

comparing, using the hardware processor, a shape of the generated probabilistic distribution of campaign conversions against shapes of distributions for other campaigns;

in response to the comparison of the shape of the generated probabilistic distribution of campaign conversions against shapes of distributions for other campaigns indicating that a difference between the shape of the generated probabilistic distribution and one of the shapes of distributions for the other campaigns is greater than a threshold amount, modifying, using the hardware processor, the campaign frequency cap for the advertising campaign;

transmitting, using the hardware processor, a request to an advertising server to prevent the advertisement and additional advertisements within the advertising campaign from being served to client devices in response to determining that the modified campaign frequency cap has been exceeded;

in response to transmitting the request to the advertisement server to prevent the advertisement and the additional advertisements within the advertising campaign from being served to the client devices, determining, using the hardware processor, whether the advertisement and the additional advertisement have been presented on the client devices using the client-side code;

in response to determining that the advertisement and the additional advertisement have been presented on one or more of the client devices, determining, using the hardware processor, that the advertisement server has not complied with the transmitted request; and determining, using the hardware processor, whether the client device that received the advertisement and the additional advertisement and that was not in compliance with the transmitted request to the advertisement server to prevent the advertisement and the additional advertisements within the advertising campaign from being served to the client devices is being correctly identified by the advertisement server.

2. The method of claim 1, wherein the campaign frequency cap for the advertising campaign is set based on campaign characteristics, and wherein the campaign characteristics include at least one of: characteristics associated with an advertiser; characteristics associated with previous campaigns associated with the advertiser; characteristics associated with campaigns similar to the advertising campaign; characteristics associated with a product or a service relating to the advertising campaign; a total number of advertisements to serve to client devices; and a total number of advertisements to serve to client devices for a given time period.

3. The method of claim 1, wherein the subset of converting users from the plurality of user types includes responder users that are determined to have responded to the advertisement by visiting a page associated with the advertisement based on visitation information.

4. The method of claim 1, wherein the subset of converting users from a plurality of user types includes casual converter users that are determined to have performed the conversion event in response to viewing the advertisement.

5. The method of claim 4, wherein identifying the client device as one of the subset of converting users from the plurality of user types is based on time between viewing the advertisement on the client device and performing the conversion event on the client device.

6. The method of claim 1, wherein updating the campaign frequency cap for the advertising campaign based on the generated probabilistic distribution further comprises:
   setting a threshold value of the subset of converting users that have viewed the advertisement and performed the conversion event; and
   determining an updated frequency cap based on the number of advertisement in the probabilistic distribution that have been viewed upon which more than the threshold value performed the conversion event.

7. The method of claim 1, wherein the method further comprises determining an in-view time of a page that includes the advertisement on the client device in response to determining that the campaign frequency cap has not been exceeded.

8. A system for determining whether to present an advertisement on client devices, the system comprising:
   a hardware processor of a server that is configured to:
      set a campaign frequency cap for an advertising campaign;
      in response to determining that the campaign frequency cap has not been exceeded, insert client-side code into an advertisement from the advertising campaign that is presented on a plurality of client devices, wherein the client-side code, when executed by each of the plurality of client devices, causes each client device to: determine a probability of whether the advertisement in the advertising campaign was likely to have been viewed on a client device;
      determine whether each of the plurality of client devices is one of a subset of converting users from a plurality of user types;
      determine, for each of the client devices identified as one of a subset of converting users, an expected number of viewed advertisements for the advertising campaign based on the probability of whether the advertisement in the advertising campaign was likely to have been viewed on a client device of one of the subset of converting users;
      generate a probabilistic distribution of campaign conversions as a function of the number of advertisements each of the subset of converting users viewed prior to performing a conversion event in response to determining the expected number of viewed advertisements for the advertising campaign based on the probability of whether the advertisement in the advertising campaign was likely to have been viewed on the client device of one of the subset of converting users;

compare a shape of the generated probabilistic distribution of campaign conversions against shapes of distributions for other campaigns;

in response to the comparison of the shape of the generated probabilistic distribution of campaign conversions against shapes of distributions for other campaigns indicating that a difference between the shape of the generated probabilistic distribution and one of the shapes of distributions for the other campaigns is greater than a threshold amount, modify the campaign frequency cap for the advertising campaign;

transmit a request to an advertising server to prevent the advertisement and additional advertisements within the advertising campaign from being served to client devices in response to determining that the modified campaign frequency cap has been exceeded;

in response to transmitting the request to the advertisement server to prevent the advertisement and the additional advertisements within the advertising campaign from being served to the client devices, determine whether the advertisement and the additional advertisement have been presented on the client devices using the client-side code;

in response to determining that the advertisement and the additional advertisement have been presented on one or more of the client devices, determine that the advertisement server has not complied with the transmitted request; and determine whether the client device that received the advertisement and the additional advertisement and that was not in compliance with the transmitted request to the advertisement server to prevent the advertisement and the additional advertisements within the advertising campaign from being served to the client devices is being correctly identified by the advertisement server.

9. The system of claim 8, wherein the campaign frequency cap for the advertising campaign is set based on campaign characteristics, and wherein the campaign characteristics include at least one of: characteristics associated with an advertiser; characteristics associated with previous campaigns associated with the advertiser; characteristics associated with campaigns similar to the advertising campaign; characteristics associated with a product or a service relating to the advertising campaign; a total number of advertisements to serve to client devices; and a total number of advertisements to serve to client devices for a given time period.

10. The system of claim 8, wherein the subset of converting users from the plurality of user types includes responder users that are determined to have responded to the advertisement by visiting a page associated with the advertisement based on visitation information.

11. The system of claim 8, wherein the subset of converting users from a plurality of user types includes casual converter users that are determined to have performed the conversion event in response to viewing the advertisement.

12. The system of claim 11, wherein identifying the client device as one of the subset of converting users from the plurality of user types is based on time between viewing the advertisement on the client device and performing the conversion event on the client device.

13. The system of claim 8, wherein updating the campaign frequency cap for the advertising campaign based on the generated probabilistic distribution further comprises:

setting a threshold value of the subset of converting users that have viewed the advertisement and performed the conversion event; and determining an updated frequency cap based on the number of advertisement in the probabilistic distribution that have been viewed upon which more than the threshold value performed the conversion event.

14. The system of claim 8, wherein the hardware processor is further configured to determine an in-view time of a page that includes the advertisement on the client device in response to determining that the campaign frequency cap has not been exceeded.

15. A non-transitory computer-readable medium containing computer-executable instructions that, when executed by a processor, cause the processor to perform a method for determining whether to present an advertisement on client devices, the method comprising:

setting a campaign frequency cap for an advertising campaign;

in response to determining that the campaign frequency cap has not been exceeded, inserting client-side code into an advertisement from the advertising campaign that is presented on a plurality of client devices, wherein the client-side code, when executed by each of the plurality of client devices, causes each client device to: determine a probability of whether the advertisement in the advertising campaign was likely to have been viewed on a client device;

determining whether each of the plurality of client devices is one of a subset of converting users from a plurality of user types;

determining, for each of the client devices identified as one of a subset of converting users, an expected number of viewed advertisements for the advertising campaign based on the probability of whether the advertisement in the advertising campaign was likely to have been viewed on a client device of one of the subset of converting users;

generating a probabilistic distribution of campaign conversions as a function of the number of advertisements each of the subset of converting users viewed prior to performing a conversion event in response to determining the expected number of viewed advertisements for the advertising campaign based on the probability of whether the advertisement in the advertising campaign was likely to have been viewed on the client device of one of the subset of converting users;

comparing a shape of the generated probabilistic distribution of campaign conversions against shapes of distributions for other campaigns;

in response to the comparison of the shape of the generated probabilistic distribution of campaign conversions against shapes of distributions for other campaigns indicating that a difference between the shape of the generated probabilistic distribution and one of the shapes of distributions for the other campaigns is greater than a threshold amount, modifying the campaign frequency cap for the advertising campaign;

transmitting a request to an advertising server to prevent the advertisement and additional advertisements within the advertising campaign from being served to client devices in response to determining that the modified campaign frequency cap has been exceeded;

in response to transmitting the request to the advertisement server to prevent the advertisement and the additional advertisements within the advertising campaign from being served to the client devices, determining whether the advertisement and the additional advertisement have been presented on the client devices using the client-side code;

in response to determining that the advertisement and the additional advertisement have been presented on one or more of the client devices, determining that the advertisement server has not complied with the transmitted request; and determining whether the client device that received the advertisement and the additional advertisement and that was not in compliance with the transmitted request to the advertisement server to prevent the advertisement and the additional advertisements within the advertising campaign from being served to the client devices is being correctly identified by the advertisement server.

16. The non-transitory computer-readable medium of claim 15, wherein the campaign frequency cap for the advertising campaign is set based on campaign characteristics, and wherein the campaign characteristics include at least one of: characteristics associated with an advertiser; characteristics associated with previous campaigns associated with the advertiser; characteristics associated with campaigns similar to the advertising campaign; characteristics associated with a product or a service relating to the advertising campaign; a total number of advertisements to serve to client devices; and a total number of advertisements to serve to client devices for a given time period.

17. The non-transitory computer-readable medium of claim 15, wherein the subset of converting users from the plurality of user types includes responder users that are determined to have responded to the advertisement by visiting a page associated with the advertisement based on visitation information.

18. The non-transitory computer-readable medium of claim 15, wherein the subset of converting users from a plurality of user types includes casual converter users that are determined to have performed the conversion event in response to viewing the advertisement.

19. The non-transitory computer-readable medium of claim 18, wherein identifying the client device as one of the subset of converting users from the plurality of user types is based on time between viewing the advertisement on the client device and performing the conversion event on the client device.

20. The non-transitory computer-readable medium of claim 15, wherein updating the campaign frequency cap for the advertising campaign based on the generated probabilistic distribution further comprises:

setting a threshold value of the subset of converting users that have viewed the advertisement and performed the conversion event; and determining an updated frequency cap based on the number of advertisement in the probabilistic distribution that have been viewed upon which more than the threshold value performed the conversion event.

21. The non-transitory computer-readable medium of claim 15, wherein the method further comprises determining an in-view time of a page that includes the advertisement on the client device in response to determining that the campaign frequency cap has not been exceeded.

* * * * *